June 30, 1959 G. T. TRIGILIO 2,892,329
DRIVE MECHANISM
Filed Sept. 26, 1958
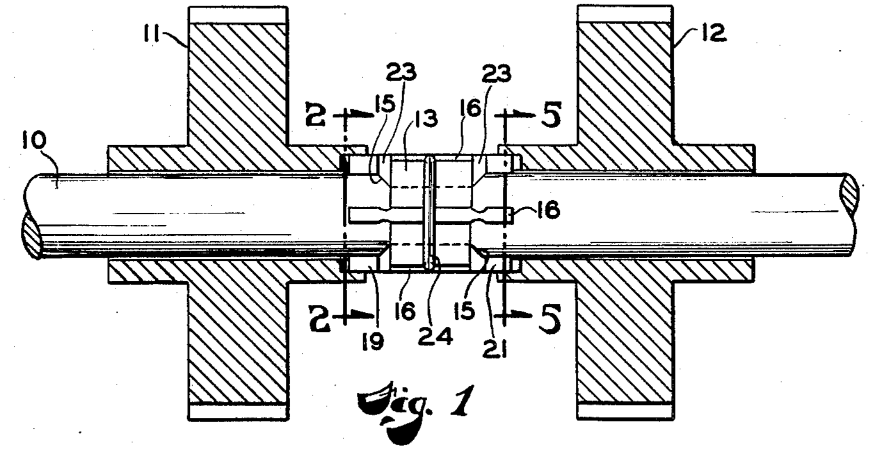
Fig. 1
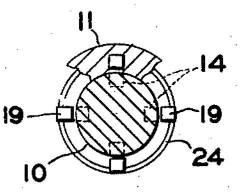
Fig. 2
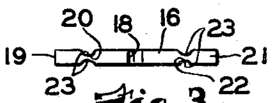
Fig. 3
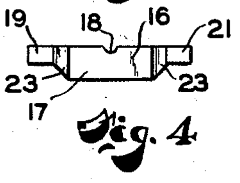
Fig. 4
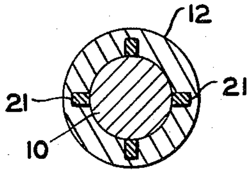
Fig. 5
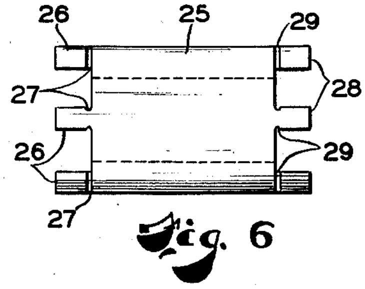
Fig. 6
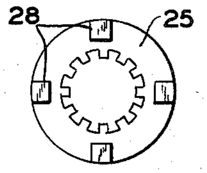
Fig. 7
Fig. 8
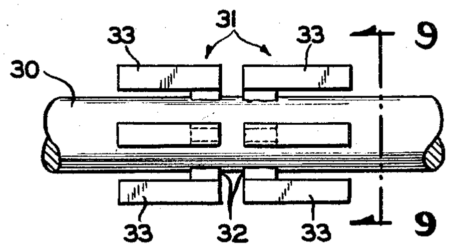
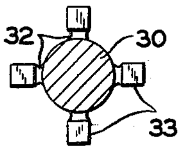
Fig. 9
*INVENTOR.*
GAETANO T. TRIGILIO
BY
Oberlin, Maky, & Donnelly
ATTORNEYS United States Patent Office 2,892,329

Patented June 30, 1959

2,892,329

DRIVE MECHANISM

Gaetano T. Trigilio, Cleveland, Ohio

Application September 26, 1958, Serial No. 763,611

7 Claims. (Cl. 64—28)

The present invention relates to an improved drive mechanism of the type comprising plural rotary elements and a common driving shaft therefor.

Such a driving arrangement is utilized in many different devices and systems wherein it is desirable or even essential that jamming or overloading of one rotary element causes the same automatically to become disengaged from the shaft, so that the other elements may continue to operate. These elements thus may take the form of pulleys, sprockets, or gears, a multiple gear pump of the type designed for aircraft being a good example of such a device. In this last case, the driving gears of plural sets of gear type fuel pumps are mounted on the same shaft and connected thereto in such manner as to provide independent shearing in the event of seizing of any driving gear.

It is a primary object of my invention to provide a new drive mechanism for the indicated and other similar applications characterized primarily by improved coupling of the rotary elements to the common shaft.

A further object is to provide such a drive mechanism wherein the shear portions occur in the shaft assembly, rather than as parts of the gears or other rotary elements.

It is also an object to provide a drive arrangement having shear sections formed and incorporated in the assembly in a manner to permit ready replacement of the same.

Other objects and advantages of the present invention will become apparent as the following description proceeds.

To the accomplishment of the foregoing and related ends, the invention, then, comprises the features hereinafter fully described and particularly pointed out in the claims, the following description and the annexed drawings setting forth in detail certain illustrative embodiments of the invention, these being indicative, however, of but a few of the various ways in which the principle of the invention may be employed.

In said annexed drawing:

Fig. 1 is an elevational view, partially in section, of a drive arrangement in accordance with the present invention;

Fig. 2 is a transverse cross-sectional view taken approximately along the line 2—2 in Fig. 1;

Fig. 3 is a top plan view of a coupling member or bar used in this assembly;

Fig. 4 is a side elevational view of such bar;

Fig. 5 is a further transverse cross-sectional view taken approximately along the line 5—5 in Fig. 1;

Fig. 6 is a side elevation of a modified form of shaft coupling;

Fig. 7 is an end view of the coupling shown in Fig. 6;

Fig. 8 shows in elevation a further modification of the invention; and

Fig. 9 is a transverse cross-sectional view taken approximately along the line 9—9 of Fig. 8.

Referring now to the drawing in detail, the preferred embodiment of the invention illustrated in Figs. 1 to 5 comprises a driving shaft 10 having two gears 11 and 12 mounted thereon in axially spaced relation and adapted to be driven by such shaft. Such gears may, for example, be the driving gears of two gear pumps and, from what has been said earlier, it will be understood that the specific character of the rotary elements is not a critical factor in the invention, whereby the illustrated gears could as well be pulleys, sprockets or other rotary drive means.

The shaft 10 is formed with an integral portion 13 of increased diameter intermediate its ends and such portion is provided with four equally spaced, axial slots 14 to a depth which is preferably greater than the difference between the diameters of the shaft proper and such enlarged portion 13. As illustrated, the bottoms of such slots are thus located within the normal cross-sectional area of the shaft, and the ends of each slot are inclined outwardly from the planes of the ends of the enlarged portion to the periphery of the shaft at both sides, as shown at 15. Elongated coupling members or bars 16 of the particular formation evident most clearly in Figs. 3 and 4 are fitted in such slots.

Each coupling bar 16 is substantially rectangular in cross-section and has a central or main portion 17 of the same length as the enlarged portion 13 of the shaft. Over such central portion, each bar is of a height slightly greater than the depth of the slot 14 receiving the same and, for a purpose to be described, the outer or top surface of the bar is provided with a small, rounded transverse groove 18. Each bar at one end has a terminal portion 19 of reduced height and a contiguous connecting portion 20 through which such end portion is joined to the main or central portion 17. Similarly formed and connected end and intermediate portions 21 and 22, respectively, are provided at the other end of the bar, and the bottom surfaces of both the intermediate portions 20 and 22 are inclined correspondingly as the ends of the shaft slot 14 in each case.

The intermediate portions 20 and 22 of the several bars are furthermore weakened by vertical grooves 23 formed in their side faces, so that these portions constitute shear sections. The reduced height of the end portions 19 and 21 of the bars is such that their bottom or inner surfaces overlie the adjacent sections of the shaft 10, whereby such end portions are connected to the shaft only through the shear sections. When inserted in their slots, the several coupling bars 16 are of course keyed to the shaft, and a snap ring 24 is fitted about the assembly to hold the bars in place, the transverse top grooves 18 of the bars and a further peripheral groove in the enlarged shaft portion accommodating this ring.

Such snap ring is of course intended primarily to facilitate assembly, and other expedients could obviously be used for this purpose. For example, the ring would not be needed if the bars are sized for press fitting in the shaft slots.

The inner or adjacent ends of the journals of the two gears are internally splined and interengaged with the respectively adjacent axially extending end portions of the coupling members 16 for drive through the latter. Accordingly, this shaft assembly will be seen to provide independent first and second series of shear connections to the gears and that, by appropriate degree of weakening, each gear is protected from predetermined excessive torque on the other. It is, moreover, important to note that the shearing of the driving connection in each case occurs in the coupling members associated with the shaft and not in the journals of the gears. When convenient to repair the assembly, it is thus a simple matter to substitute new coupling bars, which is obviously much more economical than replacement of the rotary elements.

The coupling device shown in Figs. 6 and 7 provides equivalent operation with less machining of the shaft. This device is in the form of a sleeve 25 which is internally splined for engagement on an externally splined intermediate section of the driving shaft. At one end, this sleeve is provided with integral and circumferentially spaced axial extensions 26 which correspond to the bar end portions 19 in the first-described embodiment and, similarly as the latter, these axial extensions are weakened by grooves 27, at their junctions at the end face of the sleeve. A second set of such extensions or lugs 28, with weakening grooves 29, are formed at the other end of the sleeve to provide the further independently shearable series of driving elements corresponding to the earlier described coupling bar end portions 21. Thus, in this modification the shear sections are again between the shaft and the members in driving engagement with the gears and, in fact, the only significant change is the structural one of employing a keyed sleeve body in lieu of the enlarged shaft portion and separate bars keyed therein.

The shaft 30 of Figs. 8 and 9 likewise provides independently shearable driving connections for the two gears or other rotary elements, the coupling members here being integral portions of the shaft. Each such member, designated generally by reference numeral 31, comprises a relatively short radial portion 32 and an outer portion 33 extending axially from such radial portion in slightly spaced relation to the periphery of the shaft proper. The axial portions 33, drivingly engaged with the gears in the complete assembly, extend respectively in opposite directions from the radial portions in the first and second circumferentially spaced series of the same, and the radial connecting portion of each such member is weakened by transverse grooves as illustrated for shearing from the shaft.

It will be clear that in each such form of the invention, the number of coupling members can be varied as may be appropriate in the particular installation in which the new drive mechanism is to be employed.

Other modes of applying the principle of the invention may be employed, change being made as regards the details described, provided the features stated in any of the following claims or the equivalent of such be employed.

I, therefore, particularly point out and distinctly claim as my invention:

1. Drive mechanism comprising a driving shaft, plural rotary elements on and adapted to be driven commonly by said shaft, each such rotary element having an internally splined drive section, and coupling means for each rotary element including a series of circumferentially spaced members connected to the shaft and engaged with the drive section of the rotary element, the several such coupling members being formed with weakened sections adjacent their connections to the shaft, whereby jamming and the like of any such rotary element will result in shearing of the coupling members engaged therewith thus to disconnect this element from the driving shaft.

2. Drive mechanism comprising a driving shaft, a pair of rotary elements spaced apart on and adapted to be driven commonly by said shaft, and axially extending coupling means having an intermediate portion fixed rotatively to the shaft between the two rotary elements, the end portions of said coupling means being respectively in driving engagement with the rotary elements and joined to such fixed intermediate portion through separate shear sections, whereby predetermined overloading and the like of either rotary element causes the same to become disconnected independently of the other.

3. Drive mechanism comprising a driving shaft, a pair of rotary elements spaced apart on and adapted to be driven commonly by said shaft, said rotary elements having internally splined drive sections at their opposed sides, coupling means encircling the shaft between the two rotary elements, said coupling means being rotatively fixed to the shaft at an intermediate portion thereof, and a series of circumferentially spaced axially projecting lugs at each end of such intermediate portion, the lugs at each such end being engaged with the drive section of the adjacent rotary element and joined to the intermediate portion through shear sections, whereby each rotary element can shear independently of the other.

4. Drive mechanism comprising a driving shaft, a pair of rotary elements spaced apart on and adapted to be driven commonly by said shaft, an elongated coupling member removably keyed to the shaft intermediate the two such rotary elements, said coupling member extending axially and having end portions approximately at the periphery of the shaft respectively in driving engagement with the rotary elements, and means defining shear sections in the coupling member at the regions of connection of such end portions, whereby each rotary element can become independently disconnected by shearing of the coupling member end portion associated therewith.

5. Drive mechanism comprising a driving shaft, a pair of rotary elements spaced apart on and adapted to be driven commonly by said shaft, a plurality of elongated coupling bars arranged in circumferentially spaced relation about the shaft intermediate the two rotary elements, means for removably keying such bars as thus arranged to the shaft, said bars having end portions approximately at the periphery of the shaft respectively in driving engagement with the rotary elements, and means defining shear sections in each such bar inwardly of the end portions thus engaged with the rotary elements, whereby each rotary element can shear independently of the other.

6. In drive mechanism of the character described, shaft coupling means comprising a sleeve adapted to be fixed on a driving shaft to rotate therewith, a first series of integrally formed lugs projecting axially in circumferentially spaced relation at one end of said sleeve, and a second series of lugs similarly formed and projecting at the other end of the sleeve, each such lug being weakened approximately at the junction thereof with the sleeve end face, whereby the two series of lugs provide independently shearable driving connections for a pair of rotary elements mounted commonly on a shaft carrying such sleeve.

7. In drive mechanism of the character described, a shaft adapted to drive a pair of rotary elements mounted thereon, said shaft having a first series of integral, circumferentially spaced driving members each comprising a relatively short generally radial portion and an axially extending portion joined to the shaft through such radial portion, a second series of similarly arranged and formed driving members on the shaft in spaced relation to said first series, each such series adapted to have its axially extending portions engaged with one of such rotary elements for drive of the latter, and the radial portions of the several such members being weakened for shearing of the axial portions therefrom, whereby the two such rotary elements can shear independently of one another.

References Cited in the file of this patent

UNITED STATES PATENTS

| | | |
|---|---|---|
| 2,384,188 | Mercier | Sept. 4, 1945 |
| 2,438,676 | Nickle et al. | Mar. 30, 1948 |
| 2,680,359 | Bowers | June 8, 1954 |

FOREIGN PATENTS

| | | |
|---|---|---|
| 156,373 | Great Britain | Jan. 13, 1921 |